(12) United States Patent
Bosselmann et al.

(10) Patent No.: US 7,373,823 B2
(45) Date of Patent: May 20, 2008

(54) METHOD FOR DETERMINATION OF THE STRESS ON BLADES OF A TURBINE MACHINE DURING OPERATION AND CORRESPONDING DEVICE FOR CARRYING OUT SAID METHOD

(75) Inventors: Thomas Bosselmann, Marloffstein (DE); Franz Eiermann, Rattelsdorf-Ebing (DE); Klaus Huber, Effeltrich (DE); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 138 days.

(21) Appl. No.: 10/543,138

(22) PCT Filed: Jan. 16, 2004

(86) PCT No.: PCT/EP2004/000324

§ 371 (c)(1),
(2), (4) Date: Jul. 22, 2005

(87) PCT Pub. No.: WO2004/065918

PCT Pub. Date: Aug. 5, 2004

(65) Prior Publication Data

US 2006/0048581 A1 Mar. 9, 2006

(30) Foreign Application Priority Data

Jan. 23, 2003 (DE) .................... 103 02 714
Dec. 3, 2003 (DE) .................... 103 56 513

(51) Int. Cl.
*G01N 29/04* (2006.01)
*G01N 24/00* (2006.01)
*G06F 11/30* (2006.01)

(52) U.S. Cl. .................... 73/620; 73/618; 73/660; 702/185

(58) Field of Classification Search .................. 73/781, 73/660, 620; 702/183–188
See application file for complete search history.

(56) References Cited

U.S. PATENT DOCUMENTS

| 4,131,889 | A | * | 12/1978 | Gray .................. 342/114 |
| 4,346,383 | A | * | 8/1982 | Woolcock et al. .......... 342/127 |
| 4,384,819 | A | * | 5/1983 | Baker .................... 415/14 |
| 4,413,519 | A | * | 11/1983 | Bannister et al. ......... 73/660 |
| 4,422,333 | A | * | 12/1983 | Leon ..................... 73/660 |
| 4,507,658 | A |   | 3/1985 | Keating |
| 5,206,816 | A | * | 4/1993 | Hill et al. ............... 702/56 |
| 5,479,826 | A | * | 1/1996 | Twerdochlib et al. ....... 73/660 |
| 5,748,003 | A |   | 5/1998 | Zoughi et al. |

(Continued)

FOREIGN PATENT DOCUMENTS

DE 197 05 769 A1 8/1998

(Continued)

*Primary Examiner*—Edward Lefkowitz
*Assistant Examiner*—Jonathan Dunlap

(57) ABSTRACT

The method serves to determine the vibrational state of turbine blades, arranged on a rotor shaft, mounted such as to rotate in a housing and/or of guide vanes. At least one electromagnetic wave is transmitted into a flow channel in the vicinity of the blades, using means for the generation of at least one electromagnetic wave. The electromagnetic waves are at least partly reflected from at least one blade. The reflected part of the at least one electromagnetic wave is received by means for receiving and the vibrational state of the corresponding blade is determined from a signal corresponding to the at least one received electromagnetic wave.

20 Claims, 4 Drawing Sheets

U.S. PATENT DOCUMENTS

| | | | |
|---|---|---|---|
| 5,942,690 A * | 8/1999 | Shvetsky | 73/660 |
| 6,411,105 B1 | 6/2002 | Liu | |
| 6,512,379 B2 * | 1/2003 | Harrold et al. | 324/632 |
| 6,701,286 B2 * | 3/2004 | Kauppila | 702/188 |
| 7,010,982 B2 * | 3/2006 | Bergman | 73/618 |
| 7,019,537 B2 * | 3/2006 | Hazel et al. | 324/639 |
| 7,083,384 B2 * | 8/2006 | Bosselmann et al. | 416/146 R |
| 7,095,221 B2 * | 8/2006 | Bosselmann et al. | 324/71.1 |
| 7,117,741 B2 * | 10/2006 | Klein et al. | 73/579 |
| 7,174,788 B2 * | 2/2007 | Czerw et al. | 73/620 |
| 7,302,851 B2 * | 12/2007 | Czerw et al. | 73/620 |

FOREIGN PATENT DOCUMENTS

| | | |
|---|---|---|
| DE | 198 13 041 A1 | 10/1999 |
| EP | 0 558 843 A1 | 9/1993 |
| EP | 0 806 680 A2 | 11/1997 |
| GB | 2 011 752 A | 7/1979 |
| WO | WO 95/35484 | 12/1995 |
| WO | WO 98/39670 | 9/1998 |

* cited by examiner

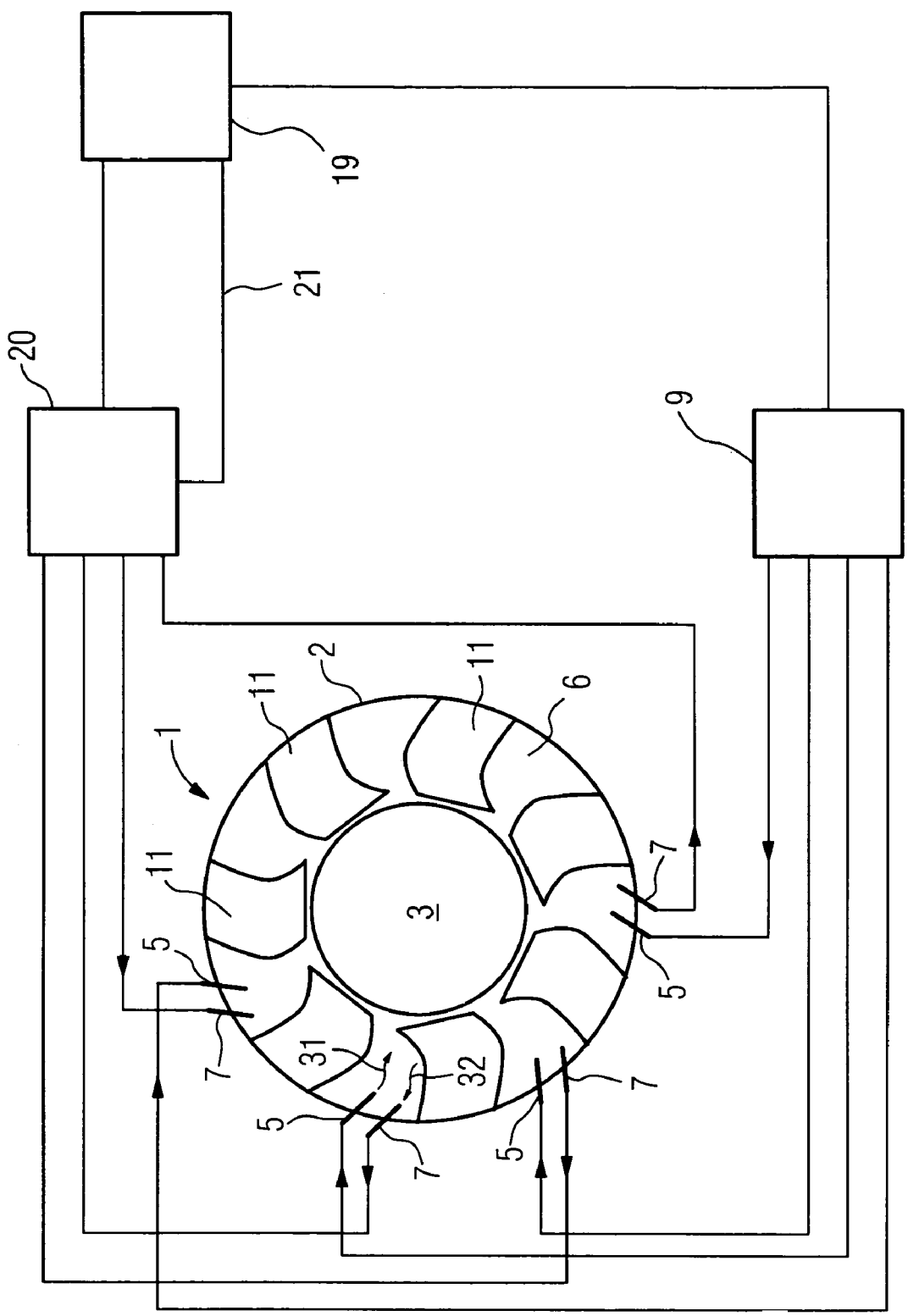

METHOD FOR DETERMINATION OF THE STRESS ON BLADES OF A TURBINE MACHINE DURING OPERATION AND CORRESPONDING DEVICE FOR CARRYING OUT SAID METHOD

This application is the US National Stage of International Application No. PCT/EP2004/000324, filed Jan. 16, 2004 and claims the benefit thereof. The International Application claims the benefits of German application No. 10302714.9, filed Jan. 23, 2003, and German application No. 10356513.2, filed Dec. 3, 2003. The International Application and the German applications are incorporated by reference herein in their entirety.

FIELD OF INVENTION

The present invention relates to method for determination of the stress on a turbine machine with turbine blades arranged on a rotor shaft mounted so as to rotate in a housing. The invention further relates to a method for determination of the stress on guide vanes arranged for fixed rotation with of a housing in a turbine machine as well as to a device for carrying out said method.

Turbine machines, for example steam or gas turbines, are used as heat power machines in technology in order to convert energy stored in a gas stream into mechanical energy, especially a rotational motion.

In order, with gas turbines in particular, to achieve the highest possible overall efficiency as regards energy usage, the gas entry temperatures of the combustion chamber in the turbine channel of the gas turbine are selected to be as high as possible. In the prior art such gas entry temperatures are around 1200° C. for example.

So that the blades arranged in the turbine channel of the turbine can withstand the physical, particularly the thermal, stresses, it is known in the prior art to provide the blades with a surface coating, Thermal Barrier Coating, abbreviated to TBC. This type of blade coating is however subject to ageing in that over time it is worn off the blades depending on the blade service life. A blade on which the surface coating is damaged is subject to very high levels of wear which leads to destruction of the blade. This results in a reduction in performance or even damage to the turbine.

In the prior art it is thus usual, based on test results and on empirical values, to define the useful life of such blades, with the turbine being dismantled in each case at the end of such an operating period to check the surface coating of the turbine blades. The disadvantage is that it takes a great deal of time and money to dismantle a turbine, with the service intervals being set so that an occurrence of the above damage is largely avoided. This further leads to maintenance also being performed if an actual wear limit has not yet been reached.

Over and above this, the stresses on the turbine blades in operation, caused by the rotational movement and by the gas flow acting on the turbine blades, are very high. Also the stresses which are only attributable to the gas flow flowing around the guide vanes are not to be ignored.

In operation the turbine blades and guide vanes always encounter mechanical vibrations. If the vibrations are too pronounced, cracks can form in the blades which in extreme cases can result in the blades rupturing. In particular, ruptured turbine blades, because of their high kinetic energy, can break through metal walls, such as the housing wall of the turbine for example. In addition to damaging the turbine this also presents a danger for people who are in the vicinity.

Monitoring the blade vibrations during operation enables fast reactions when the need arises and measures to be taken to counter the causes of the vibration.

One option for monitoring turbine blade vibrations can be executed in accordance with WO 95/35484 with the aid of microwaves. In this case a microwave guide is positioned in the vicinity of a rotating set of blades of a turbine and is positioned so that, as the rotor shaft rotates, the blade tips pass the opening of the waveguide tube. A continuous wave of microwave energy is than sent through the waveguide tube to the rotating set of blades. When a blade tip passes through the path of the continuous wave a reflected wave is created which together with the sent wave forms a standing wave. This collapses as soon as the blade tip moves on and only forms again when the following blade tip appears in front of the opening. Each passage of an individual blade tip through the path of the continuous wave creates a signal in the timing of the blade tips passing the opening. Fluctuations in the regularity of the timing supply information about the vibration state of the blades. In a further embodiment the intensity of the reflected wave is measured, which also changes in the timing of the blade tips going past. The signal is evaluated in this case in a similar way to the previously described embodiment. With this known device is It however only possible to a limited extent to obtain information about the vibration status. Since the wave emitted at the blade tips is reflected only vibration modes are detected which are especially pronounced at the blade ends. Modes with particular characteristics in the area between rotor shaft and blade tip cannot be captured with this device. This disclosed device for blade vibration monitoring cannot be used in particular for a specific embodiment of blade wheels, in which all blade tips of a wheel are connected to each other with a ring. This is because with these blade wheels the only vibration modes which occur are those in which the area between rotor shaft and blade tip vibrates, whereas the blade tips themselves are fixed by the ring and cannot vibrate. Furthermore it is in principle not possible with this disclosed device to measure vibrations of the guide vanes.

SUMMARY OF THE INVENTION

It is thus the object of the present invention to provide a method and a device for executing said method with which a more comprehensive monitoring of the state of the turbine blades and/or guide vanes can be achieved as regards stresses during operation.

A method for determining the stress on turbine blades arranged on a rotor shaft mounted so that it can rotate within a housing in a turbine machine is proposed as a way of achieving the object of the invention, whereby, through means for creating at least one electromagnetic wave at least one electromagnetic wave is emitted in the turbine channel in an area of the turbine blades, the at least one electromagnetic wave is at least partly reflected by at least one turbine blade, the reflected part of the at least one electromagnetic wave is received by means for receiving and the stress on the turbine blades is determined from a signal corresponding to at least one electromagnetic wave received.

Use is made of the effect that the reflected component of the at least one electromagnetic wave contains information about the stress status or the degree or the measure of adverse effect on the blades in relation to the required status, which can be determined by evaluation of the received signal. The parameters in question here are especially amplitude and/or phase and/or the spectral distribution of the signal.

A method is further proposed by the invention for determining the stress on a turbine machine with guide vanes arranged for fixed rotation in a housing, whereby, through means for creating at least one electromagnetic wave at least one electromagnetic wave is sent out in the turbine channel in an area of the guide vanes, the at least one electromagnetic wave is at least partly reflected by at least one guide vane, the reflected part of the at least one electromagnetic wave is received by means for receiving and the stress on the guide vanes is determined from a signal corresponding to at least one electromagnetic wave received.

In addition a combination of the two previous methods is proposed in order to determine the stress on the turbine blades or guide vanes simultaneously or separately.

A method is further proposed with the invention for determining the surface quality of the blades as a measure of the stress on them. Firstly this makes it possible to not only determine a corresponding status of the blades without dismantling the turbine, but also to monitor the turbine during operation. Thus maintenance of the turbine can then advantageously be undertaken when the stress means that a definitive limit for wear as regards the surface quality is reached. The maintenance intervals can thus be extended to meet the actual requirements. The costs caused by maintenance of the turbine, especially the downtimes as well, can be markedly reduced. To execute the method a number of electromagnetic waves can also be emitted, which can for example be emitted distributed over the circumference of the turbine channel. Likewise the reflected components can naturally be received at different points of the circumference of the turbine channel, so that this enables additional and/or more precise information about the status of the surface quality to be obtained. Naturally the method can also be used as in tandem for determining surface quality of guide vanes arranged in a turbine machine, in which case however the means for creating at least one electromagnetic wave and for receiving are arranged on the rotatably mounted rotor shaft.

Advantageously the surface quality of non-rotating elements of the turbine machine can also be monitored in this way. For example means arranged distributed over the circumference of the turbine machine for emitting at least one electromagnetic wave can be used, with an arrangement being able to be provided to meet particular requirements. Accordingly receive means can be provided to receive reflected electromagnetic waves. In order to reduce the effort involved in operating such an arrangement, provision can be made for example for operation of the arrangement in pulse mode and/or in time division multiplex mode. An addition provision can also be made for a means for emitting at least one electromagnetic wave to be simultaneously also used for receiving, with this being arranged on the housing in the area of the turbine blades to be monitored.

It is further proposed that in accordance with a surface structure to be determined at least one electromagnetic wave matched to the relevant surface form is used with a matched wavelength. It can thus advantageously be achieved that the effects of the damage are especially favorable for the at least one electromagnetic wave, in order for example to obtain a high signal level for the evaluation unit from which the surface quality is determined.

In a further embodiment it is proposed that the means for creating at least one electromagnetic wave are used for receiving at least one electromagnetic wave. Components as well as installation and construction effort in the turbine can be reduced. Thus an antenna can be used for example both for sending and also for receiving.

Furthermore it is proposed that the surface quality is determined from an intensity of the at least one received electromagnetic wave. Thus an evaluation of the signal can be obtained advantageously with simple and cost-effective means. In addition other suitable wavelengths can also be used, for example millimeter waves and suchlike.

A method is also proposed with the invention for using the vibration status of the blades as a measure for the stress. It is thus possible, as well as the vibration states which make the tips of the blades vibrate, also to establish vibration states for which the modes are particularly pronounced in the central area of the blade, that is between blade tip and rotor shaft. The advantage of this is that the information about the vibration status of the blades is more comprehensive and more precise than that obtained by the prior art. Damage which is attributable to the modes which are particularly pronounced in the center area of the blades can be avoided by timely intervention.

To execute the method a number of electromagnetic waves can also be emitted which for example can also be emitted distributed over the circumference of the turbine channel. Likewise the reflected components can naturally be received at different points over the circumference of the turbine channel in order in this way to obtain additional and more precise information about the vibration status of the turbine blades. Of course the method can naturally also be used in tandem for determining a vibration status of guide vanes arranged in a turbine machine, in which case however the means for creating at least one electromagnetic wave and for receiving can also be arranged on the rotatable rotor shaft.

A method is further proposed by the invention for determining the vibration status of guide vanes arranged for fixed rotation in a housing, whereby, through means for creating at least one electromagnetic wave at least one electromagnetic wave is sent out in the turbine channel in an area of the guide vanes, the at least one electromagnetic wave is at least partly reflected by at least one guide vane, the reflected part of the at least one electromagnetic wave is received by means for receiving and the vibration status of the guide vane is determined from a signal corresponding to at least one electromagnetic wave received.

In addition a combination if the two previous methods is proposed to determine the vibration status, in order to determine the vibration status of the turbine blades and guide vanes simultaneously or separately.

Advantageously the vibration status of non-rotating elements of the turbine machine can also be monitored in this way. For example means arranged distributed over the circumference of the turbine machine for emitting at least one electromagnetic wave can be used, with an arrangement being able to be provided to meet particular requirements. Accordingly receive means can be provided to receive reflected electromagnetic waves. In order to reduce the effort involved in operating such an arrangement, provision can be made for example for operation of the arrangement in pulse mode and/or in time division multiplex mode. An addition provision can also be made for a means for emitting at least one electromagnetic wave to be simultaneously used for receiving, with this being arranged on the housing in the area of the guide vanes to be monitored.

It is further proposed that in accordance with a surface structure to be determined at least one electromagnetic wave matched to the relevant surface form is used with a matched wavelength. It can thus be advantageously achieved that the effects of the vibrations are especially favorable for the at least one electromagnetic wave in order for example to obtain a high signal level for the evaluation unit from which the degree of vibration status is determined.

It is additionally proposed that at least one radar wave is used as at least one electromagnetic wave. Advantageously known existing means for creating and transmitting radar waves can be employed. Effort as well as costs can be further reduced. Furthermore, the use of radar waves allows matching as regards the vibration frequency and/or the damage to the blades, so that a more favorable signal for monitoring the vibrations status and/or the surface quality can be achieved.

In a further embodiment it is proposed that the means for creating at least one electromagnetic wave is used for receiving at least one electromagnetic wave. Components as well as installation and construction effort in the turbine can be reduced. Thus a radar antenna can be used for example both for sending and also for receiving.

It is further proposed that the vibration status of the blades is determined by comparing the frequency of the at least one electromagnetic wave emitted with at least one electromagnetic wave received. Thus an evaluation of the signal can be obtained advantageously with simple and cost-effective means. In addition other suitable wavelengths can also be used, for example millimeter waves and suchlike.

It is also proposed that the surface quality and the vibration status of the blades is determined simultaneously as a measure of the stress. As well as the savings in time and costs a simultaneous measurement also provides a more comprehensive overview of the stresses on the blades, allowing prompt intervention if there are signs that damage might occur.

Furthermore a device for executing the method in accordance with the invention is proposed, which features means for creating an electrical vibration, means for creating at least one electromagnetic wave from the vibration, means for receiving at least one electromagnetic wave and an evaluation unit for evaluating a signal corresponding to the at least one electromagnetic wave which can be received. Advantageously the means for creating at least one electromagnetic wave and for receiving it are arranged in the turbine channel of the turbine machine. These can be embodied as antennas in each case which are suitable for creating and emitting the electromagnetic waves or for receiving and generating a corresponding signal. The means for creating an electric vibration can for example be formed by an electronic oscillator which is effectively connected to the antenna for creating at least one electromagnetic wave. The means for receiving at least one electromagnetic wave are preferably effectively connected to an evaluation unit which is able to determine, from the signal supplied by the receiving means, information about the vibration status and/or the surface quality of the blades.

Furthermore it is proposed that the means for creating at least one electromagnetic wave is suitable both for sending and for receiving at least one electromagnetic wave. In this way the number of components can be further reduced. Thus for example the means for creating at least one electromagnetic wave can be effectively connected via a means of coupling with the means for creating a vibration. A signal corresponding to the at least one received electromagnetic wave is fed via the means of coupling to the evaluation unit. A number of means of coupling and antennas can also be provided which for example are connected in parallel with a number of assigned evaluation units or also with an evaluation unit for example in a time division multiplexing arrangement.

In an advantageous further development of the present invention it is proposed that the means for creating at least one electromagnetic wave is at least one radar antenna. The radar antenna can be of a compact design and have small dimensions. The radar antenna is suitable for emitting at least one radar wave and also for receiving at least one radar wave. To this end it can for example be connected to a circulator via which a vibration can be fed to the antenna, in which case a receive signal supplied by the radar antenna can be delivered to the evaluation unit at the same time. Especially advantageously a method in accordance with the Doppler principle can be used in which the receive wavelength differs from the transmit wavelength. Through suitable, especially electronic means, a simultaneous operation involving emitting and receiving of electromagnetic waves can be achieved. In addition a wave pulse can also be emitted, with the means for creating at least one electromagnetic wave being switched to receive in the pulse pauses. Energy and effort for creating the at least one electromagnetic wave can be saved.

In a further embodiment it is proposed that the means for creating at least one electronic wave is arranged in the turbine machine, especially a gas turbine. In the large machine field in particular, a cost effective monitoring of the blades can be achieved with the inventive device, which enables expensive downtimes as a result of maintenance and repair measures in particular to be further reduced. Thus for example an increase in the availability of an energy supply system equipped with a gas turbine can be achieved. The device in accordance with the invention can additionally be embodied such that the effects on the gas flow in the turbine channel of the turbine machine are kept as small as possible.

Further advantages and features can be found in the following description of the Figures. The same components are indicated by the same reference symbol in different Figures. With regard to components which have the same function, the reader is referred to the description given in the first exemplary embodiment

BRIEF DESCRIPTION OF THE DRAWING

The figures show:

FIG. 1 shows a gas turbine 1 of the prior art which is designed for a high gas entry temperature of around 1200° C. The gas turbine 1 features turbine blades 4 arranged on a rotor shaft 3 which is mounted to be rotatable in a housing 2. Furthermore guide vanes 11 are provided connected to the housing 2 in a fixed rotational arrangement (FIG. 4, FIG. 5) The turbine blades 4 and the guide vanes 11 are especially each provided with a surface coating 12, 13 to enable them to withstand the physical stresses in the turbine channel 6 of the gas turbine 1.

Figure 1:
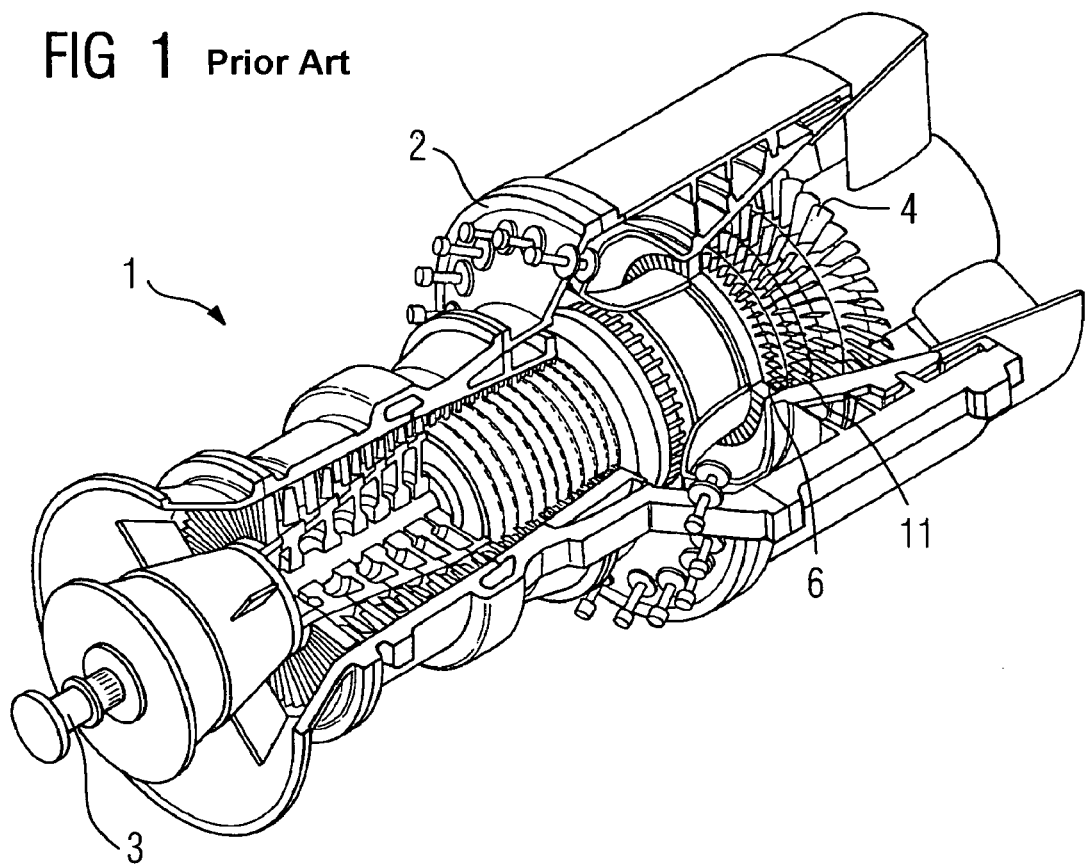
FIG. 1 a gas turbine of the prior art in a part cross-sectional, perspective view, FIG. 2 an enlarged view of a cross section from the drawing in FIG. 1 with a device in accordance with invention, FIG. 3 a basic block diagram for executing the method in accordance with the invention, FIG. 4 a turbine blade of the gas turbine in FIG. 1, FIG. 5 a guide vane of the gas turbine in FIG. 1, FIG. 6 a basic block diagram of a further embodiment for monitoring guide vanes and FIG. 7 an antenna arrangement for monitoring turbine blades.
Figure 3:
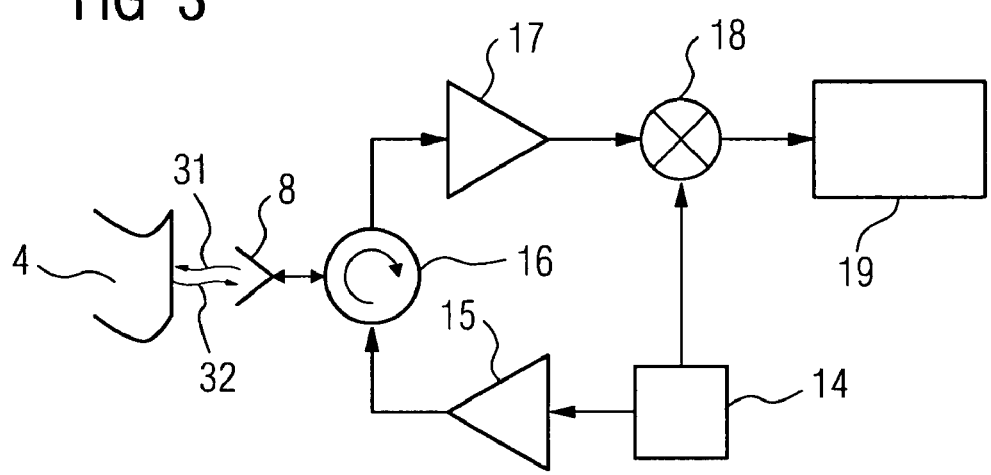
Figure 2:
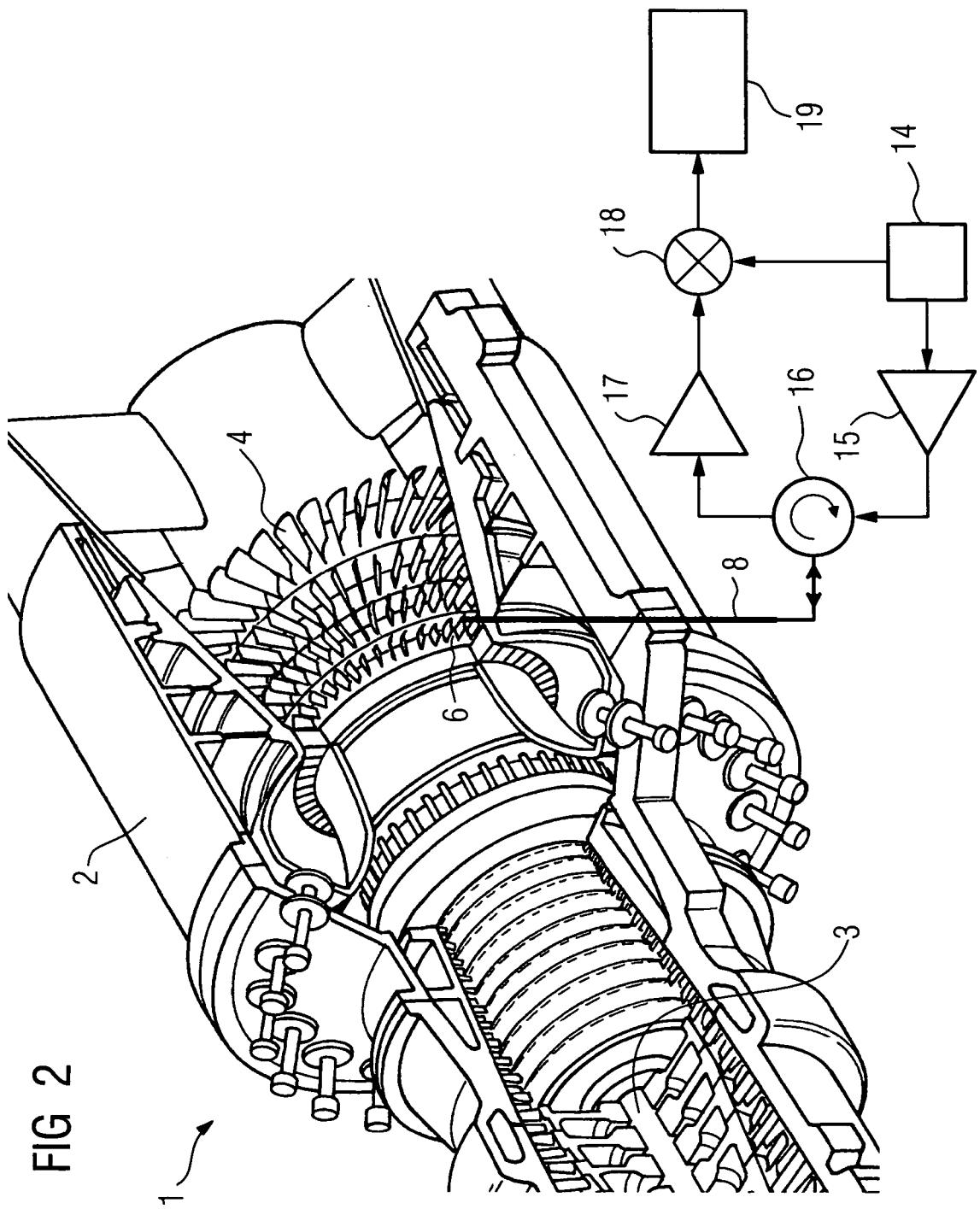
As shown in FIG. 2, the turbine 1 is equipped with an inventive device which features an antenna 8, especially a radar antenna, which projects into the turbine channel 6 of the gas turbine 1. The radar antenna 8 is especially arranged between two rows of turbine blades in the area of the turbine blades 4 to be monitored. The radar antenna 8 is used as a means for emitting at least one electromagnetic wave and also as a means for receiving the at least one electromagnetic wave. The radar antenna 8 has a connection for communication with a circulator 16. The inventive device further features a high-frequency generator 14 which is effectively connected via an amplifier 15 to the circulator 16. The circulator 16 is at the same time connected to a receive amplifier 17 and to a mixer 18 which for its part is at the same time connected to the high-frequency generator 14. One output of the mixer 18 is coupled to the evaluation unit 19 (FIG. 2).

In the exemplary embodiments shown in FIGS. 2 and 3 the principle of a Doppler radar is used. In this principle at least one electromagnetic (radar) wave 31 is emitted with a fixed wavelength which is reflected by an object to be monitored (=turbine blade 4) moved in relation to the antenna 8. Through the relative movement the receive wavelength in the reflected part 32 of the at least one electromagnetic wave is shifted in relation to the emitted wavelength in accordance with the known physical effects and the antenna 8 generates a corresponding signal.

In detail the method of the exemplary embodiment dealt with here executes as shown in FIG. 3 and as described below.

An electronic high-frequency generator 14 generates a high frequency with a fixed, specifiable wavelength which preferably corresponds to one of the frequencies $f_0$ specified in Table 1.

TABLE 1

| $F_0$/GHz | 2.4 | 5.8 | 24 | 61 | 122 | 245 |
|---|---|---|---|---|---|---|
| $F_0$/kHz | 6.032 | 14.577 | 60.32 | 153.3 | 306.6 | 459.9 |

The high frequency is fed to an amplifier 15, which for its part feeds the amplified high frequency via the circulator 16 to the antenna 8. The antenna 8 generates from the high frequency energy fed to it at least one corresponding radar wave 31 and emits this in accordance with its radiation characteristics. The turbine blades 4 passing the radar antenna 8 reflect a part 32 of the radar beam back to the antenna 8, in which case, because of its movement relative to the antenna made up of rotational movement and vibration, causes a change of wavelength. In the embodiment shown here, with a rotation frequency of 60 Hz and with an effective distance of appr. 1 m between the pivot axis and the area of the blade 4 captured by the at least one radar wave 31, the frequency $f_D$ corresponding to the wavelength change is produced in accordance with the formula:

$$f_D(t) = f_0 \cdot \frac{2v(t)}{C_0}$$

In this case $f_0$ is the frequency of the at least one emitted wave 31, v(t) the relative speed of the surface of the turbine blades 4 and guide vanes 11 reflecting the at least one electromagnetic wave 31 in relation to the antenna 8 and $C_o$ the speed of propagation of the at least one electromagnetic wave 31, 32. the at least one electromagnetic wave 31, 32.

The at least one reflected electromagnetic wave 32 is transformed via the antenna 8 into an electrical signal again, which is fed to the circulator 16. The circulator 16 now separates the received signal from the sent signal and feeds this signal to the receive amplifier 17. From the receive amplifier 17 the signal reaches a mixer 18, in which it is mixed with a signal which corresponds to the high frequency of the high frequency generator 14. In this case the phase angles of the high frequency from the high frequency generator 14 and of the signal from the receive amplifier 17 are taken into account accordingly. The output signal of the mixer 18 delivers a signal with the differential frequency between receive frequency and emitted high frequency. This signal with the frequency $f_D$, as listed in Table 1 is fed to the evaluation unit 19 which determined from the characteristics of this signal (=amplitude and/or phase and/or its spectral distribution) the vibration status and/or the status of the surface quality of the corresponding turbine blades 4. The evaluation result determined is notified via display units or notification units not presented in any greater detail to the monitoring point or to a control center. The evaluation unit can also be equipped with a comparison function with which the fact that a predetermined threshold value has been reached can be determined. Thus for example, when the threshold value is reached, a message is automatically output indicating that maintenance is to be performed on the turbine 1. A signal intensity can preferably be used for this.

Figure 4:
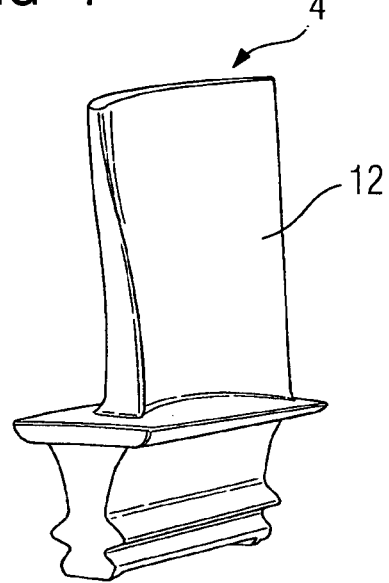
Figure 5:
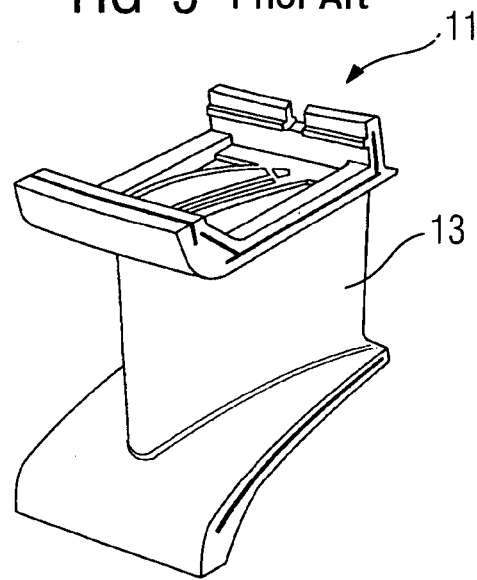
Figure 7:
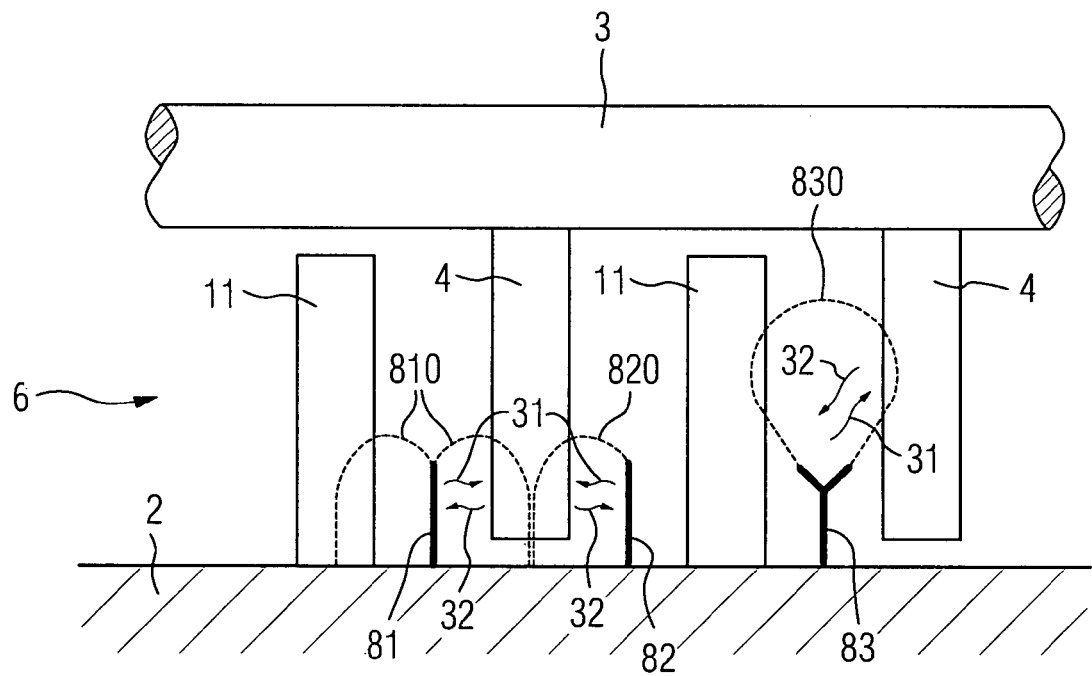

The antenna 8 is embodied and arranged so that the at least one reflected electromagnetic wave 32 exhibits at least a partial frequency shift in relation to the at least one electromagnetic wave 31 emitted. FIG. 7 shows typical embodiments and arrangements of different antennas 81, 82 and 83 with the associated radiation characteristics 810, 820 or 830 in each case. The antennas 81, 82 and 83 are arranged in the turbine channel 6 in the area of the turbine blades 4 and/or guide vanes 11 to be monitored between the rows of blades. An embodiment as a rod antenna or as coaxial antenna is suitable, especially embodied as a coaxial dipole antenna. Other forms of antenna are however also conceivable. The radiation characteristics can be embodied symmetrically, as with the antennas 81 and 83, or asymmetrically, as with the antenna 82. For embodying a Doppler shift which is as large as possible it is worthwhile for the moved parts, in this case the turbine blades 4, to pass though the spatial area covered by the radiation characteristics 810, 820 or 830. A movement in which the turbine blades 4—move in their entirety or only in specific areas of their surface (cf. the contour shown in FIG. 4, bent in a number of directions)— initially towards the relevant antenna 81, 82 or 83 and then away from it is especially advantageous in this regard. It is however also possible with this arrangement to determine the Doppler shift generated only by the vibration of the parts which are fixed relative to the antennas 81, 82 or 83, these being the guide vanes 11 in this case. The Doppler shift is derived in this in this case only from the vibration movement but not from a relative movement through the rotational movement.

Basically the antennas 81, 82 and 83, in addition to the active operating mode described here, i.e. with explicit emission of at least one electromagnetic wave 31 can also be operated passively for the purpose of recording the turbine blades 4 and/or the guide vanes 11. In passive mode the antennas 81, 82 and 83 do not emit any send radiation, but only receive electromagnetic radiation which is present in the turbine channel 6, especially also as a result of defects in the turbine blades 4 and/or in the guide vanes 11. The antennas 81, 82 and 83 are then also exclusively intended for "listening".

In a further embodiment of the present invention the guide vanes 11 and/or the turbine blades 4 of a gas turbine 1 are monitored by means of pulse radar. A basic block diagram of such an embodiment for capturing the guide vanes 11 is shown in FIG. 6. In the area of the guide vanes 11 of the gas turbine 1 connected for fixed rotation to the housing 2 send antennas 5 distributed over the circumference of the turbine channel 6 of the gas turbine 1 for emitting at least one electromagnetic wave 31 are arranged. The antennas 5 are connected to a high frequency generator 9 which supplies each antenna with high frequency. The high frequency generator 9 is a pulse generator which generates short high-frequency pulses with a specifiable pulse duty ratio and distributes these pulses in a time division multiplexing scheme to the antennas 5 connected to it. Furthermore receive antennas 7 are distributed over the circumference of the turbine channel 6 for receiving reflected electromagnetic waves 32. The receive antennas 7 are connected to a multiplexer 20 which simultaneously performs the function of a receive amplifier. In this embodiment the result of using a multiplexer 20 is that one antenna 7 is connected to the evaluation unit 19 with discrete timing. At the same time the evaluation unit 19 receives high frequency from the high frequency generator 9. In addition the evaluation unit 19 receives via a line 21 a channel select signal which transfers information about the selected antenna 7 to the evaluation unit 19. The guide vane monitoring shown here is operated in pulse mode so that the overall energy consumption can be kept low. This also enables a system to be obtained in which the components for generating at least one electromagnetic wave can be designed overall for a lower stress as regards thermal influences.

The present invention is not to be seen as being restricted to the exemplary embodiment. Also included in the protected area is the fact that a number of radar antenna are provided for emitting and receiving the waves, in order for example to provide redundancy for the measurement or also achieve greater accuracy.

In addition the present invention provides for a simultaneous measurement of the vibration status and the surface quality of the said blades.

The present invention is not restricted to the use of just one single electromagnetic wave 31, 32. It of course also includes the emission and receiving of a number of electromagnetic waves or of wave spectrums.

The invention claimed is:

1. A method for determining stress of at least one turbine blade or vane of a plurality of turbine blades or vanes that are arranged in rows of a turbine machine, comprising:
   providing at least one electromagnetic wave emitter for emitting at least one electromagnetic emission wave;
   providing at least one electromagnetic wave receiver for receiving at least one electromagnetic receive wave;
   converting the electromagnetic emission wave into the electromagnetic receive wave by at least partially reflecting the electromagnetic emission wave by providing the at least one turbine blade or vane with a reflection surface arranged on a contoured airfoil surface of the blade or vane;
   arranging the electromagnetic wave emitter and the electromagnetic wave receiver at least one location between the blade or vane rows and operatively connected to the reflection surface of the blade or vane;
   matching the electromagnetic emission wave to a surface form of the blade or vane;
   emitting the electromagnetic emission wave by the electromagnetic wave emitter;
   converting the electromagnetic emission wave into the electromagnetic receive wave by the reflection surface of the blade or vane;
   receiving the electromagnetic receive wave by the electromagnetic wave receiver; and
   determining the stress of the blade or vane by frequency analysis to assist in determining component integrity by analyzing the received electromagnetic receive wave to effect an evaluation of the reflection surface by the at least one analyzer.

2. The method according to claim 1, wherein the method is executed to determine the stress of both a turbine blade and a guide vane.

3. The method according to claim 1, wherein analyzing the received electromagnetic wave comprises an evaluation of a surface quality of the reflection surface used for determining the stress.

4. The method according to claim 3, wherein the matched electromagnetic emission wave comprises a wavelength based on a shape of the reflection surface.

5. The method according to claim 3, wherein the evaluation of the surface quality comprises detecting an intensity of the electromagnetic receive wave.

6. The method according to claim 1, wherein analyzing the received electromagnetic wave comprises an evaluation of a vibration status of the reflection surface used for determining the stress.

7. The method according to claim 6, wherein emitting the electromagnetic emission wave comprises at least one electromagnetic emission wave having a wavelength based on a surface shape of the reflection surface.

8. The Method according to claim 6, wherein the evaluation of the vibration status comprises comparing a frequency of the electromagnetic emission wave and to a frequency of the electromagnetic receive wave.

9. The method according to claim 1, wherein analyzing the received electromagnetic wave comprising an evaluation of a surface quality of the reflection surface and an evaluation of a vibration status of the reflection surface, wherein the surface quality and the vibrational status are used for determining the stress.

10. The method according to claim 9, wherein the evaluation of the surface quality and the evaluation of the vibrational status are executed simultaneously.

11. The method according to claim 1, wherein determining the stress of the turbine component is executed while an operation of the turbine machine.

12. The method according to claim 1, wherein the electromagnetic emission wave is a radar wave.

13. A turbine machine, having a device for determining a stress of at least one turbine blade or vane of a plurality of turbine blades or vanes that are arranged in rows of the turbine machine, comprising:
   at least one electromagnetic wave emitter for emitting at least one electromagnetic emission wave that is matched to a surface form of the blade or vane;
   at least one electromagnetic wave receiver for receiving at least one electromagnetic receive wave; and
   at least one analyzer for analyzing the electromagnetic receive wave that evaluates the reflection surface used for determining the stress via frequency analysis,
   the turbine blade or vane comprising a reflection surface for converting the electromagnetic emission wave into the electromagnetic receive wave by at least partially reflecting the electromagnetic emission wave where the reflection surface is arranged on a contoured airfoil surface of the blade or vane, and
   the electromagnetic wave emitter and the electromagnetic wave receiver arranged at at least one location between the turbine blade or vane rows and operatively connected to the reflection surface of the turbine blade or vane.

14. The turbine machine according to claim 13, wherein the electromagnetic wave emitter and the electromagnetic wave receiver are operatively connected to the reflection surface such that by emitting the electromagnetic emission wave converting the electromagnetic emission wave into the electromagnetic receive wave and receiving the electromagnetic receive wave occur.

15. The turbine machine according to claim 13, further comprising a housing with a turbine channel in which the component rows are arranged.

16. The turbine machine according to claim 13, wherein the electromagnetic wave emitter comprises an electric vibration generator for generating an electric vibration and a transformer for transforming the electric vibration into the electromagnetic emission wave.

17. The turbine machine according to claim 13, wherein the electromagnetic wave emitter and the electromagnetic wave receiver form one integrated unit.

18. The turbine machine according to claim 13, further comprising a radar antenna included in the electronic wave emitter or in the electronic wave receiver.

19. The turbine machine according to claim 13, wherein the turbine machine is a gas turbine.

20. A device for determining stress of at least one turbine blade or vane of a plurality of turbine blades or vanes that are arranged in rows of the turbine machine, comprising:

at least one electromagnetic wave emitter for emitting at least one electromagnetic emission wave that is matched to a surface form of the blade or vane;

at least one electromagnetic wave receiver for receiving at least one electromagnetic receive wave; and at least one analyzer for analyzing the electromagnetic receive wave that evaluates the reflection surface used for determining the stress via frequency analysis, the turbine blade or vane comprising a reflection surface for converting the electromagnetic emission wave into the electromagnetic receive wave by at least partially reflecting the electromagnetic emission wave where the reflection surface is arranged on a contoured airfoil surface of the blade or vane, and the electromagnetic wave emitter and the electromagnetic wave receiver sized and configured to be arranged at at least one location between the turbine blade or vane rows and operatively connectable to the reflection surface of the turbine blade or vane.

* * * * *